(12) United States Patent
Sugiyama (10) Patent No.: US 7,725,021 B2
(45) Date of Patent: May 25, 2010

(54) LIGHTING SYSTEM FOR SHOOTING

(75) Inventor: Akihiro Sugiyama, Kanagawa-Ken (JP)

(73) Assignee: Nikon Corporation, Tokyo (JP)

( * ) Notice: Subject to any disclaimer, the term of this patent is extended or adjusted under 35 U.S.C. 154(b) by 241 days.

(21) Appl. No.: 11/583,803

(22) Filed: Oct. 20, 2006

(65) Prior Publication Data
US 2007/0122138 A1 May 31, 2007

(30) Foreign Application Priority Data
Oct. 24, 2005 (JP) ............... 2005-308094

(51) Int. Cl.
G03B 15/03 (2006.01)
G03B 15/06 (2006.01)

(52) U.S. Cl. ............... 396/171; 396/182; 396/199

(58) Field of Classification Search ............... 396/155, 396/182, 28, 56, 157, 162, 198, 199, 267, 396/544, 171; 362/3, 4, 11, 16; 348/370, 348/371
See application file for complete search history.

(56) References Cited

U.S. PATENT DOCUMENTS 4,392,183 A * 7/1983 Ostlund et al. ............... 362/11
6,480,679 B1 11/2002 Ishida et al.
2003/0086704 A1 * 5/2003 Takematsu ............... 396/182
2004/0240868 A1 12/2004 Iwasaki
2005/0135078 A1 * 6/2005 Hamada et al. ............... 362/3

FOREIGN PATENT DOCUMENTS

JP      A-9-211566      8/1997

* cited by examiner

Primary Examiner—W. B. Perkey
Assistant Examiner—Minh Q Phan
(74) Attorney, Agent, or Firm—Oliff & Berridge, PLC (57) ABSTRACT

A lighting system of the present invention includes a master flash device, a remote flash device, a support part, and a light guiding member. The master flash device emits light in accordance with a light emission control of a camera. The remote flash device has a light-receiving part that receives the light of the master flash device and emits light in accordance with the light-receiving result of the light-receiving part. The support part has the remote flash device mounted at a place where the light of the master flash device is shielded by a shooting lens or a camera. The light guiding member optically forms a detour optical path that guides the light of the master flash device to the light-receiving part.

10 Claims, 7 Drawing Sheets

LIGHTING SYSTEM FOR SHOOTING

CROSS-REFERENCE TO RELATED APPLICATION

This application is base upon and claims the benefit of priority from Japanese Patent Application No. 2005-308094, filed on Oct. 24, 2005, the entire contents of which are incorporated herein by reference.

BACKGROUND OF THE INVENTION

1. Field of the Invention

The present invention relates to a lighting system for shooting.

2. Description of the Related Art

There is a known lighting system which realizes multiple lighting and enhanced lighting using a master flash device and a remote flash device. The remote flash device emits light in connection with the detection of the light emission of the master flash device (patent document 1 described below).

Also, a ring-like flash device mounted at the front end of a lens is known as a flash device for macro shooting. Normally, a ring-like flash device of this kind is connected to an adapter on a camera via a cable and emits light in accordance with an electric signal (X contact) of the camera.

[Patent document 1] United States Patent Application Publication No. 2004/0240868

[Patent document 2] U.S. Pat. No. 6,480,679

SUMMARY OF THE INVENTION

The inventor of the present invention has studied a lighting system in a novel form, in which a remote flash device is arranged at the front end of a lens. In such a configuration of the lighting system, however, the light of a master flash device has difficulty in reaching the remote flash device at the front end of the lens because a lens barrel blocks the light. Hence, it leads to a problem that the remote flash device at the front end of the lens cannot emit light properly.

Therefore, an object of the present invention is to provide a lighting system which ensures more definitive light emission of a remote flash device in such a circumstance that the light of a master flash device does not reach the remote flash device directly.

The present invention will be explained below.

<<1>> A lighting system of the present invention includes a master flash device, a remote flash device, a support part, and a light guiding member.

The master flash device emits light in accordance with a light emission control of a camera.

The remote flash device has a light-receiving part that receives the light of the master flash device and emits light in accordance with the light-receiving result of the light-receiving part.

It is possible for the support part to have the remote flash device mounted at a place where a shooting lens or a camera blocks the light of the master flash device.

The light guiding member optically forms a detour optical path that guides the light of the master flash device to the light-receiving part.

According to the present invention, the light-receiving part of the remote flash device can receive the light of the master flash device more reliably. As a result, the flash device has greater freedom of arrangement.

<<2>> Preferably, the light guiding member is arranged in one of a group composed of the support part, camera, shooting lens, and remote flash device.

<<3>> Preferably, the light guiding member includes a prism that captures the light of the master flash device.

<<4>> Preferably, the light guiding member is provided on the outer circumferential area of the support member. The light guiding member guides the light of the master flash device to the light-receiving part along the outer circumferential area irradiated with the light.

<<5>> Preferably, the light guiding member includes a radiation suppression member. The radiation suppression member suppresses the light of the master flash device irradiated in a direction different from that of the light-receiving part.

<<6>> Preferably, the support member is a ring-like stage. The ring-like stage is arranged annularly on the outer circumference of the shooting lens. Further, the ring-like stage supports the remote flash device in the circumferential area of the shooting lens.

<<7>> Preferably, the light guiding member is provided at the annular part of the ring-like stage and guides the light of the master flash device along the annular part to the light-receiving part located within the shadow of the shooting lens.

<<8>> Preferably, the support member is a base of the remote flash device arranged self-supportably. The light guiding member guides the light to the light-receiving part by reflecting or diffusing, the light being irradiated at the base from the master flash device.

<<9>> Another lighting system of the present invention includes a master flash device and a remote flash device.

The master flash device emits light in accordance with a light emission control of a camera.

The remote flash device has a light-receiving part that receives the light of the master flash device and emits light in accordance with the light-receiving result of the light-receiving part.

In such a configuration, the remote flash device includes a leg part made of a material that transmits the light of the master flash device. The light-receiving part is arranged inside or near the leg part so as to receive the light that has transmitted through the leg part.

<<10>> Preferably, a support member is provided to guide the light of the master flash device to the light guiding member by reflecting or diffusing the light.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be explained below with reference to drawings.

First Embodiment

Figure 1:
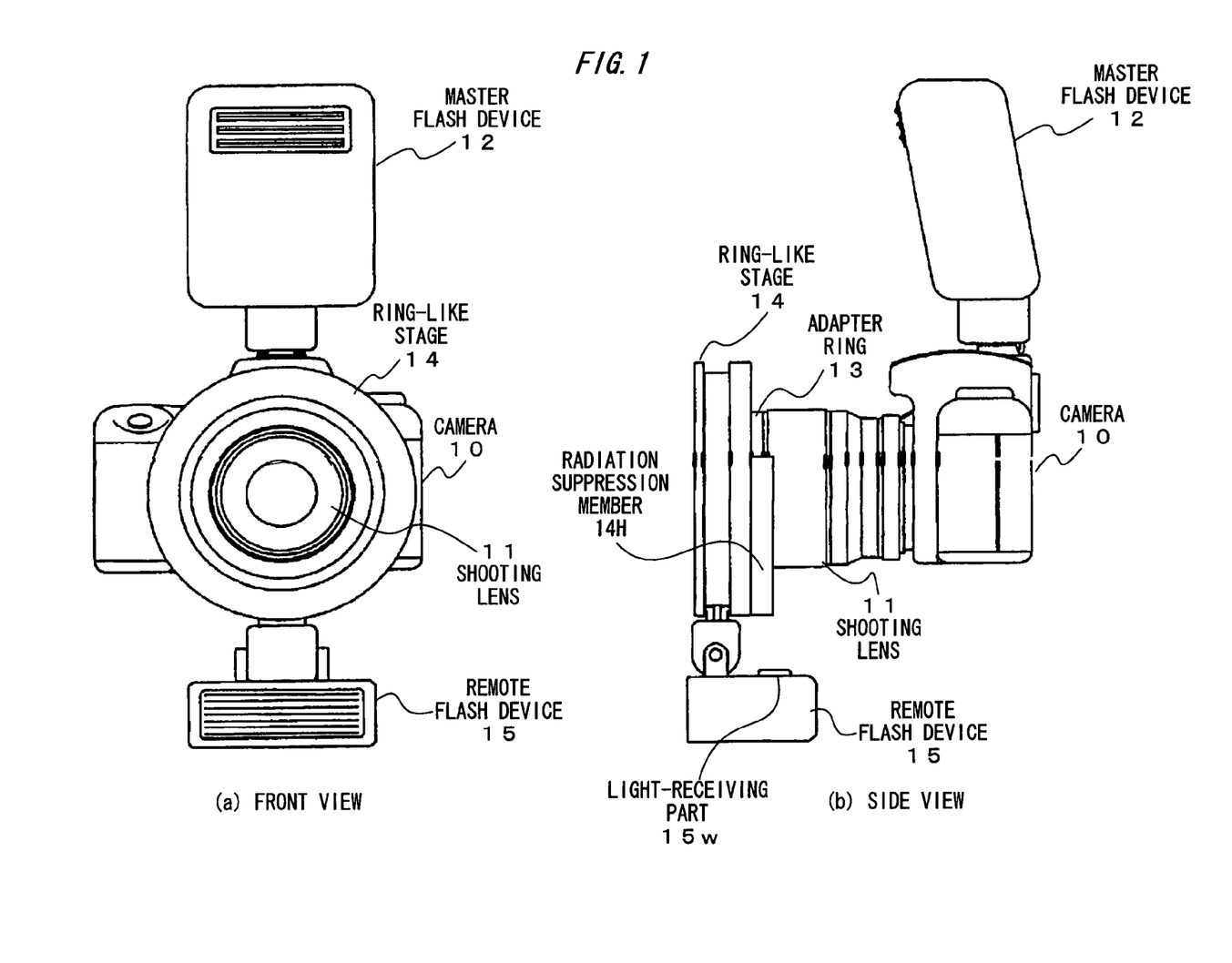
FIG. 1 is diagrams showing a first embodiment.
Figure 2:
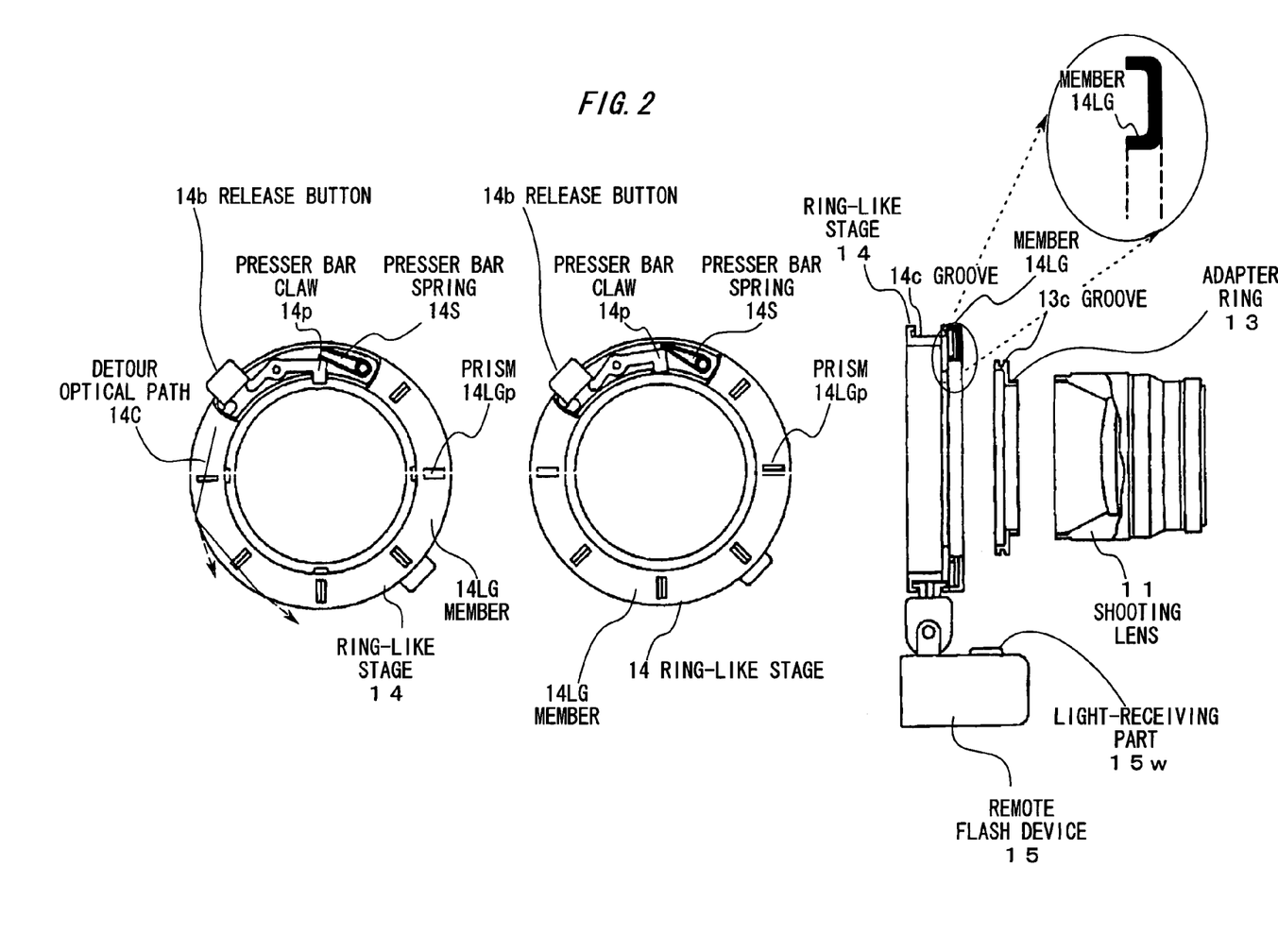
FIG. 2 is a diagram showing essential parts of the first embodiment.

FIG. 1 is diagrams showing a first embodiment. FIG. 2 is a diagram showing essential parts of the present embodiment. The configuration of a lighting system will be explained below using FIG. 1 and FIG. 2.

First, onto the top part of a camera 10, a master flash device 12 is mounted. Further, to the camera 10, a shooting lens 11 is mounted. On the front end of the lens barrel of the shooting lens 11, an adapter ring 13 is fixed by a screw or the like. On the outer circumference of the adapter ring 13, a groove 13c is formed. Into the groove 13c a ring-like stage 14 is mounted.

The ring-like stage 14 is provided with a presser bar claw 14p pressed by a presser bar spring 14s. By the presser bar claw 14p hooking to the groove 13c, the ring-like stage 14 is fixed on the front end of the lens barrel of the shooting lens 11 via the adapter ring 13. Incidentally, the ring-like stage 14 is provided with a release button 14b. By pressing the release button 14b, the ring-like stage 14 can be detached from the adapter ring 13.

Further, on the peripheral wall of the ring-like stage 14, a groove 14c is provided. Into the groove 14c, one or a plurality of remote flash devices 15 are mounted. The remote flash device 15 is provided with a light-receiving part 15w that receives the light of the master flash device 12. In response to the light-receiving result of the light-receiving part 15w, the remote flash device 15 emits light.

A user can freely change the installation position of the remote flash device 15 by sliding the remote flash device 15 along the groove 14c. Further, because the diameter of the ring-like stage 14 is larger than that of the lens barrel of the shooting lens 11, the ring-like stage 14 protrudes out and forms a marginal surface (a member 14LG shown in FIG. 2) which faces the camera 10.

(Explanation of the Operation of the First Embodiment)

Figure 3:
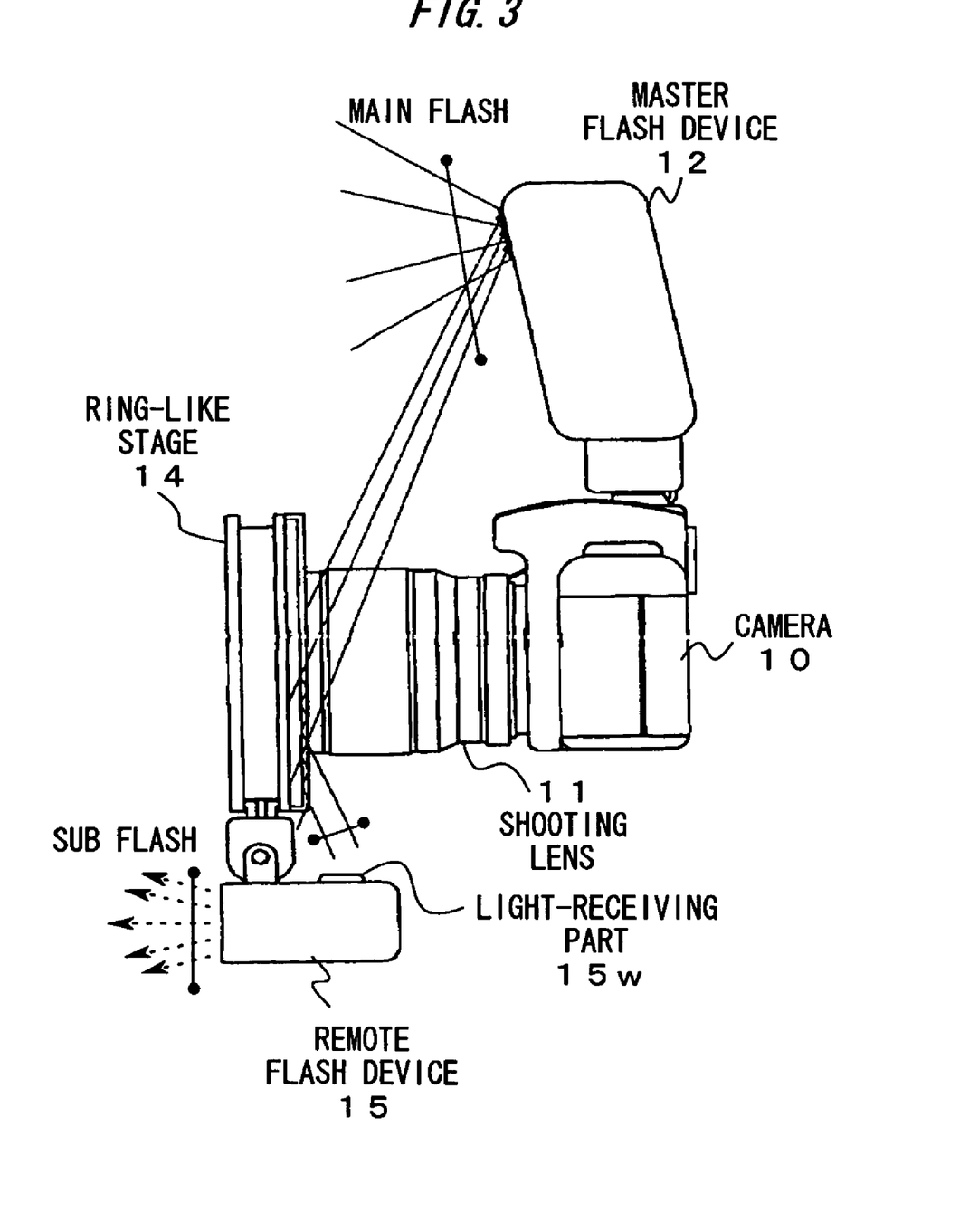
FIG. 3 is a diagram for explaining the operation of the first embodiment.

FIG. 3 is a diagram for explaining the operation of the first embodiment.

The operation of the first embodiment will be explained below with reference to FIG. 1 to FIG. 3.

The master flash device 12 emits a main flash in accordance with a light emission control of the camera 10. In the positional relationship of the devices shown in FIG. 3 the main flash is shielded by the lens barrel of the shooting lens 11 and does not reach the light-receiving part 15w directly. Incidentally, when the shooting lens 11 is a thin lens, the main flash is sometimes shielded by the top part or the like of the camera 10.

In cases like this, the member 14LG can receive the main flash directly because it protrudes around the outer periphery of the lens barrel. When the member 14LG is a material that transmits infrared, the infrared included in the main flash enters into the plate of the member 14LG and repeat internal reflection within the plate (refer to FIG. 3). As a result, a detour optical path 14C, as shown in FIG. 2, is formed along the annular part. Part of the main flash is guided through the detour optical path 14C to the shadow part of the lens barrel. Consequently, the light-receiving part 15w can reliably receive the main flash even if located in the shadow part of the lens barrel. Due to the optical action of the ring-like stage 14, the remote flash device 15 can emit a sub flash in connection with the main flash.

(Supplementary Items of the First Embodiment)

In the first embodiment, the fully circumferential ring-like stage 14 is used. However, the present invention is not limited to this. It may also be possible to make the ring-like stage 14 into an arc form (a part of the entire circumference).

Figure 4:
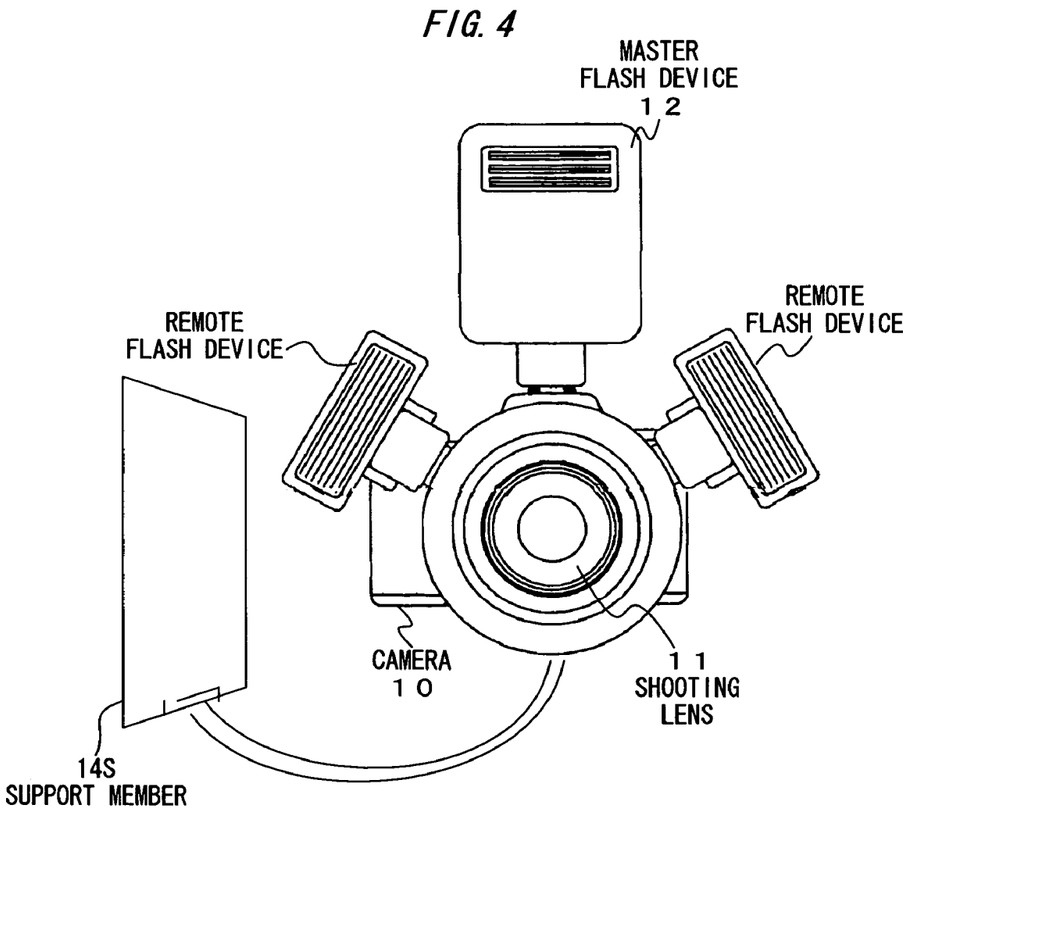
FIG. 4 is a diagram showing a sate in which a plurality of remote flash devices are mounted.

The first embodiment has explained the case where only one remote flash device 15 is mounted on the ring-like stage 14. However, the present invention is not limited to this. It may also be possible to mount a plurality of remote flash devices on the ring-like stage 14 as shown in FIG. 4.

In the first embodiment, as shown in FIG. 2, it may also be possible to arrange a prism 14LGp annularly on the surface of the member 14LG. The prism 14LGp is formed as a protrusion or a recess. By efficiently capturing the main flash using the prism 14LGp located in the irradiation range of the main flash, it is possible to increase the amount of light that reaches the light-receiving part 15w. Further, it is also possible to efficiently emit the main flash having passed through the detour optical path 14C from the prism 14LGp near the light-receiving part 15w and to increase the amount of light that reaches the light-receiving part 15w. As a result, it is made possible to cause the remote flash device 15 to emit light more reliably. Further, it is also made possible to raise the light emission threshold value of the remote flash device 15 by the increased amount of light that reaches the light-receiving part 15w. In this case, it is possible to reduce the occurrence of the erroneous light emission of the remote flash device 15 due to the circumjacent noise light.

Incidentally, it is also possible for such a prism 14LGp to serve as a scale that indicates the angle of the ring-like stage 14, a mark for positioning, and a finger rest.

As to the member 14LG, as long as it functions as a light guide that guides part of the main flash to the light-receiving part 15w, its shape, dimensions, and material are not limited in particular.

In the first embodiment, the member 14LG may be constituted as a cover that covers the ring-like stage 14. Further, it is preferable to cause the remote flash device 15 to emit light more reliably by arranging the cover at an angle that bends the main flash toward the direction of the light-receiving part 15w.

In the first embodiment, the main flash is guided to the light-receiving part 15w by being reflected repeatedly on the inner surface within the plate of the member 14LG. However, the present invention is not limited to this. For example, it may also be possible to guide the main flash to the light-receiving part 15w by diffusing or reflecting the main flash on the surface of the member 14LG.

In the first embodiment, the detour optical path 14C that transmits infrared included in the main flash is formed by the member 14LG. However, the present invention is not limited to the infrared. It may also be possible to guide the light having a wavelength other than that of the infrared by changing the wavelength band of the detour optical path. Further, in the first embodiment, using the ring-like stage 14 as the support part, the remote flash device 15 is arranged at the front end of the lens barrel of the shooting lens 11. However, the present invention is not limited to this. For example, it may also be possible to mount the remote flash device 15 via the barrel part of the tripod base of the lens, the middle position of the lens barrel, the support part provided on the camera 10, or the like.

In the first embodiment, the member 14LG, that is, a light guiding member, is provided on the ring-like stage 14. However, the present invention is not limited to this. It may also be possible to arrange the light guiding member in the camera 10, the shooting lens 11, the remote flash device 15, or the like, as long as a detour optical path to the light-receiving part 15w can be formed.

Further, in the first embodiment, the master flash device 12 is mounted on the top part of the camera 10. However, the present invention is not limited to this. For example, it may also be possible to use the master flash device 12 as a built-in strobe light. The master flash device 12 can be arranged at a separated position from the camera 10 as long as the light guiding member can be irradiated with the main flash at the position.

In the first embodiment, the member 14LG is arranged at the position irradiated with the main flash of the master flash device 12. However, the present invention is not limited to this. It may also be possible to guide the main flash via a plurality of light guiding members.

Second Embodiment

Figure 5:
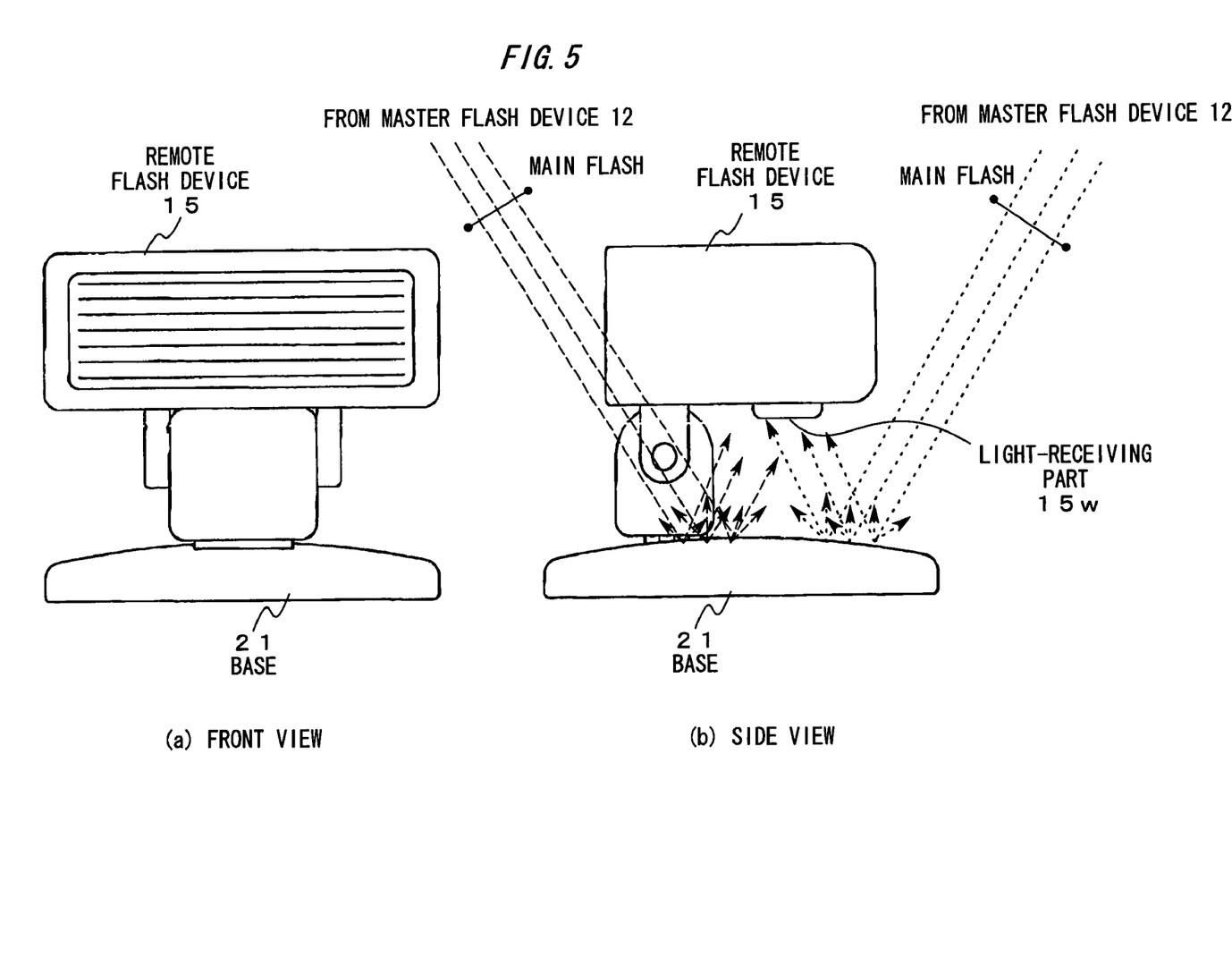
FIG. 5 is diagrams showing a second embodiment.

FIG. 5 is diagrams showing a second embodiment. In the figure, the remote flash device 15 is mounted on a base 21 instead of the ring-like stage 14. The light-receiving part 15w of the remote flash device 15 faces downward and is in opposition to the top surface of the base 21. Further, the base 21 is formed by a material (for example, white or gray resin) that reflects the main flash (or infrared included therein).

In this state, the main flash of the master flash device 12 reaches the top surface of the base 21. Then, as shown in FIG. 5, the top surface of the base 21 guides the main flash to the light-receiving part 15w by diffusing or reflecting the main flash. The remote flash device 15 emits the sub flash in response to the light-receiving result.

Consequently, even if the light-receiving part 15w faces downward and the main flash does not reach thereto directly, it is possible to cause the remote flash device 15 to emit light reliably.

Incidentally, it is preferable for the top surface of the base 21 to have a proper surface roughness without direction dependence so as to efficiently diffuse light from multiple directions. Due to such a diffusing action of the light without direction dependence, it is made possible to reliably guide even the main flash that enters from any direction to the light-receiving part 15w.

Figure 6:
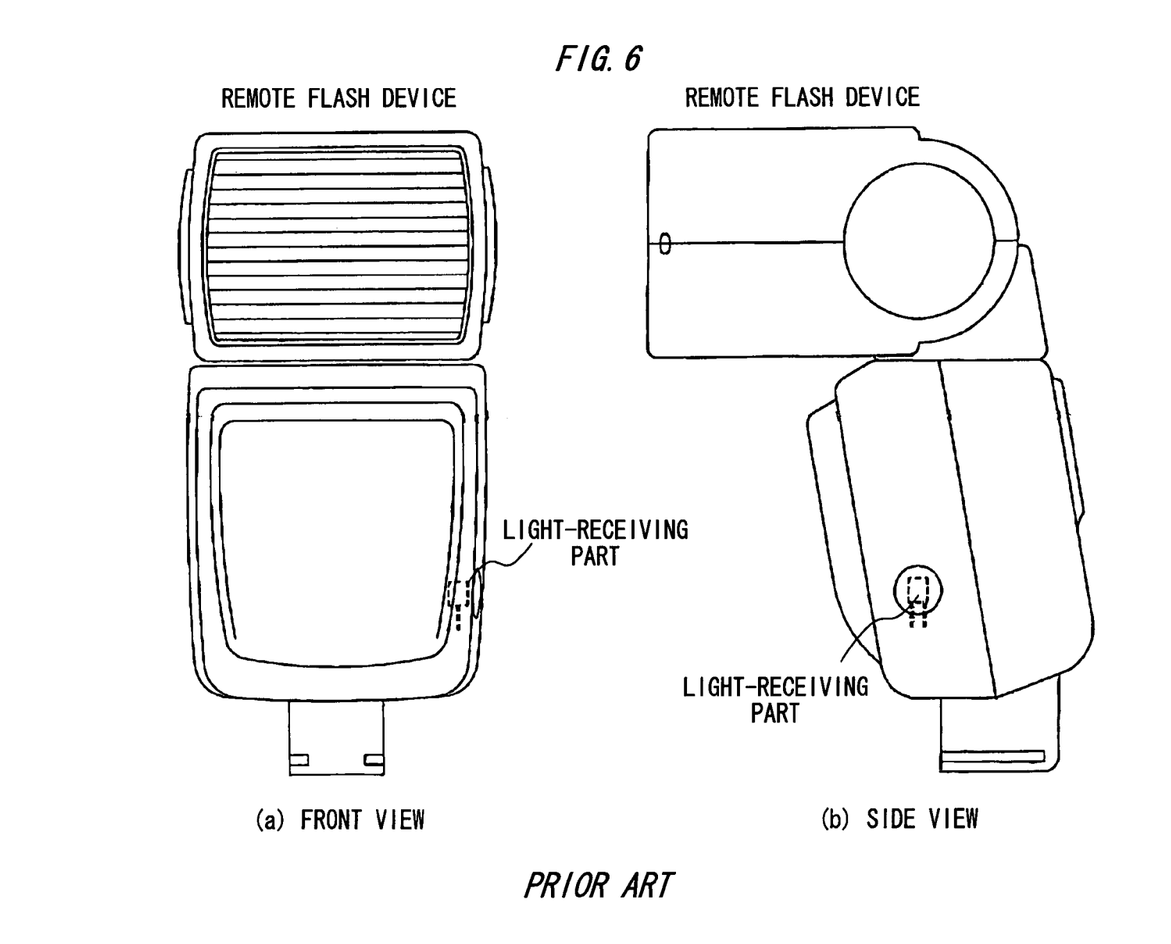
FIG. 6 is diagrams of the prior art.

For example, in the conventional remote flash device as shown in FIG. 6, the light-receiving part is arranged on any one of the surfaces of the case. Because of this, it is not possible to receive the main flash from the direction of the shaded surface. Consequently, it is not possible to arrange the remote flash device shown in FIG. 6 in an arbitrary direction.

However, in the second embodiment, as described above, due to the configuration in which the base 12 and the light-receiving part 15w are arranged substantially horizontally and in opposition to each other, it is made possible to receive light from almost all the directions without difficulty. Consequently, in the second embodiment, the flexibility of arrangement of the remote flash device 15 substantially increases.

Third Embodiment

Figure 7:
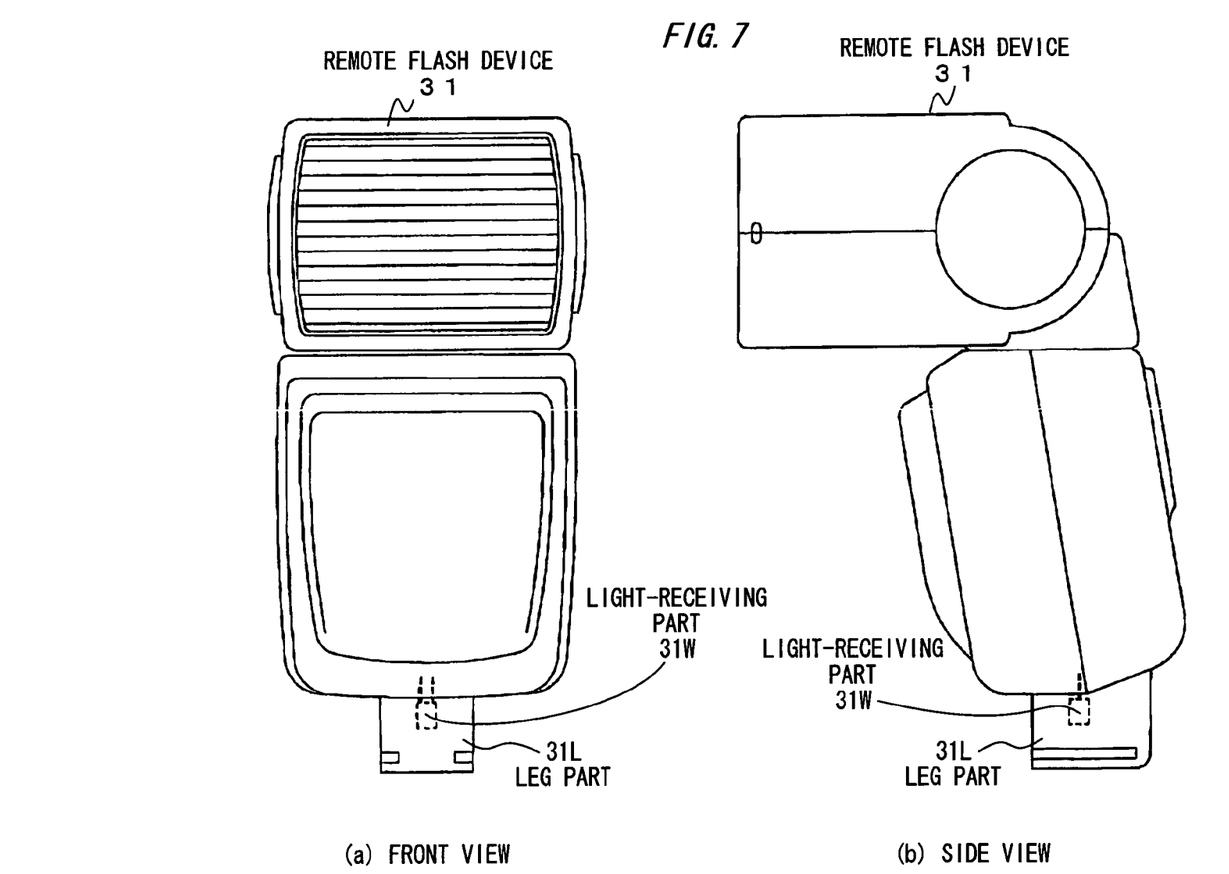
FIG. 7 is diagrams showing a third embodiment.

FIG. 7 is diagrams showing a third embodiment. In the figure, a remote flash device 31 is mounted on a tripod, the ring-like stage 14 shown in FIG. 1, the base 21 shown in FIG. 5, or the like. The remote flash device 31 has a leg part 31L. A material (a widely known resin having the infrared permeability, etc.) that transmits part of the main flash (infrared, etc.) is used for the sides of the leg part 31L.

Further, inside the leg part 31L, a light-receiving part 31w is arranged instead of the above-described light-receiving part 15w as shown by the dotted line in FIG. 7. It is possible for the light-receiving part 31w to receive the main flash of the master flash device 12 through the leg part 31L.

Consequently, use of the remote flash device 31 instead of the above-described remote flash device 15 results in lifting the restriction by shadow position of the leg part. As a result, the flexibility of arrangement increases even more.

In the third embodiment, it may also be possible to arrange the light-receiving part 31w in the vicinity of the leg part 31L. With this configuration also, it is made possible to receive the main flash having passed through the leg part 31L by the light-receiving part 31w.

In the embodiments described above, it may also be possible to arrange a support member that guides the main flash for the light guiding member. For example, as shown in FIG. 4, by arranging a support member 14S composed of a diffusion plate etc., it is possible to adequately form a detour optical path up to the light guiding member.

Further, in each of the embodiments described above, it may also be possible to configure a lighting system so as to further cause another remote flash device to emit light by using the sub flash of the remote flash devices 15 and 31.

In each of the embodiments described above, it may also be possible to provide a radiation suppression member so as to suppress light irradiated from the light guiding member in a direction different from that of the light-receiving part. For example, as shown in FIG. 1[b], a radiation suppression member 14H is provided. The radiation suppression member 14H reflects (or absorbs) and suppresses light irradiated from the ring-like stage 14 in a direction different from that of the light-receiving part 15w. Due to this action, it becomes unlikely that another remote flash device located in a different direction emits light erroneously.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A lighting system of a camera comprising:
    a camera to which a lens barrel having a shooting lens is mountable, the camera performs shooting through the mounted shooting lens;
    a master lighting device that emits light in accordance with a light emission control of the camera;
    a stage that is attachable to and removable from at least a part of an outer circumference of the shooting lens;
    a remote lighting device that is detachably upheld on a peripheral wall of the stage, the remote lighting device having a light-receiving part that receives the light of the master lighting device, and emits light in accordance with a light-receiving result of the light-receiving part; and
    a light guiding member that is arranged uniformly on the stage away from the light-receiving part and optically forms a detour optical path that guides the light of the master lighting device to the light-receiving part, wherein
    the light guiding member on the stage is placed in opposition to the light-receiving part of the remote lighting device upheld on the peripheral wall of the stage.

2. The lighting system of the camera according to claim 1, wherein the light guiding member includes a light guiding path that makes a part of the light emitted by the master lighting device enter inside of the stage from a predetermined surface thereof, repeats total reflection inside the stage, and radiates the part of the light from a surface different from the predetermined surface of the stage to the light-receiving part or in a direction of the light-receiving part.

3. The lighting system of the camera according to claim 2, wherein the light guiding member further includes a cover member covering the light guiding path and that guides the light from the master lighting device to the light-receiving part or in the direction of the light-receiving part by repeating total reflection within an inner surface of the cover member.

4. The lighting system of the camera according to claim 1, wherein:

the stage is a ring-like stage attached to an entire circumference of a front end part of the lens barrel;

the remote lighting device is attachable to and removable from an arbitrary position of a peripheral wall of the ring-like stage; and the light guiding member is formed in a protruding shape on virtually all parts of the peripheral wall of the ring-like stage facing a body of the camera.

5. The lighting system of the camera according to claim 1, wherein:

the master lighting device emits a flash including an infrared component; and the light guiding member guides the infrared component in an illuminating light to the light-receiving part or in a direction of the light-receiving part.

6. The lighting system of the camera according to claim 1, wherein the light guiding member includes a reflection member that suppresses the light irradiated from the master lighting device in a direction different from that of a light guiding path to the light-receiving part.

7. The lighting system of the camera according to claim 1, wherein a prism for guiding the light from the master lighting device to the light-receiving part or in a direction of the light-receiving part is arranged on a part of a surface of the peripheral wall of the stage facing a body of the camera as a part of the light guiding member.

8. A stage device to which a remote lighting device is mountable on a peripheral wall thereof and being detachable from at least a part of an outer circumference of a shooting lens barrel mountable to a camera that controls a light emission of a master lighting device, comprising:

an upholding part which is arranged on the peripheral wall and detachably upholds a remote lighting device that has a light-receiving part receiving a light of the master lighting device and emits a light in accordance with a light-receiving result of the light-receiving part; and a light guiding member that guides the light from the master lighting device to the light-receiving part of the remote lighting device upheld by the upholding part or in a direction of the light-receiving part, wherein said light guiding member is configured uniformly on the stage and away from the light-receiving part so as to be placed in opposition to the light-receiving part of the remote lighting device upheld by the upholding part.

9. The stage device according to claim 8, wherein the light guiding member includes a light guiding path that makes a part of the light emitted by the master lighting device enter inside of the stage from a predetermined surface thereof, repeats total reflection inside the stage, and radiates the part of the light from a surface different from the predetermined surface of the stage to the light-receiving part or in a direction of the light-receiving part.

10. The stage device according to claim 9, wherein:

the light guiding member further includes a cover member covering the light guiding path and that guides the light from the master lighting device to the light-receiving part or in the direction of the light-receiving part by repeating total reflection within an inner surface of the cover member;

the stage is a ring-like stage attached to a whole circumference of a front end part of the lens barrel;

the remote lighting device is attachable to and removable from an arbitrary position of a peripheral wall of the ring-like stage; and the light guiding member is formed in a protruding shape on virtually all parts of the peripheral wall of the ring-like stage facing a body of the camera.

* * * * *